United States Patent
Ding et al.

(10) Patent No.: US 12,239,966 B2
(45) Date of Patent: Mar. 4, 2025

(54) METHODS OF PRODUCING CATALYST COMPOSITIONS, AND METHODS OF CRACKING HYDROCARBON FEED STREAMS USING SUCH CATALYST COMPOSITIONS

(71) Applicant: Saudi Arabian Oil Company, Dhahran (SA)

(72) Inventors: Lianhui Ding, Dhahran (SA); Faisal Alotaibi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 309 days.

(21) Appl. No.: 18/051,910

(22) Filed: Nov. 2, 2022

(65) Prior Publication Data

US 2024/0139720 A1    May 2, 2024

(51) Int. Cl.
*B01J 29/78*    (2006.01)
*B01J 21/04*    (2006.01)
(Continued)

(52) U.S. Cl.
CPC ........... *B01J 29/7815* (2013.01); *B01J 21/04* (2013.01); *B01J 29/084* (2013.01); *B01J 29/80* (2013.01);
(Continued)

(58) Field of Classification Search
CPC ...... B01J 29/7815; B01J 21/04; B01J 29/084; B01J 29/80; B01J 35/615; B01J 35/633;
(Continued)

(56) References Cited

U.S. PATENT DOCUMENTS 7,462,276 B2   12/2008   Wang et al.
11,148,124 B2  10/2021   Ding
(Continued)

FOREIGN PATENT DOCUMENTS

EP    1194236 B1    11/2003

OTHER PUBLICATIONS

Camblor et al., "Characterization of nanocrystalline zeolite Beta", Microporous and Mesoporous Materials, vol. 25, pp. 59-74, 1998.
(Continued)

*Primary Examiner* — Randy Boyer
*Assistant Examiner* — Juan C Valencia
(74) *Attorney, Agent, or Firm* — DINSMORE & SHOHL LLP

(57) ABSTRACT

This disclosure generally relates to methods for producing catalyst compositions, which may include forming a precursor solution comprising a silicon-containing material, an aluminum-containing material, and a quaternary amine, hydrothermally treating the precursor solution at a first temperature to form an intermediate mixture, hydrothermally treating the intermediate mixture at a second temperature to form beta zeolite, wherein the first temperature is less than the second temperature by at least 200° C., forming an extrudable mixture comprising the beta zeolite, alumina, a metal precursor, and a binder, extruding the extrudable mixture to form extrudates, and calcining the extrudates to form the catalyst composition.

20 Claims, 1 Drawing Sheet

(51) Int. Cl.

| | |
|---|---|
| *B01J 29/06* | (2006.01) |
| *B01J 29/08* | (2006.01) |
| *B01J 29/80* | (2006.01) |
| *B01J 35/61* | (2024.01) |
| *B01J 35/63* | (2024.01) |
| *B01J 35/64* | (2024.01) |
| *B01J 37/00* | (2006.01) |
| *B01J 37/03* | (2006.01) |
| *B01J 37/04* | (2006.01) |
| *B01J 37/08* | (2006.01) |
| *C10G 47/20* | (2006.01) |

(52) U.S. Cl.
CPC ............ *B01J 35/615* (2024.01); *B01J 35/633* (2024.01); *B01J 35/635* (2024.01); *B01J 35/647* (2024.01); *B01J 37/0018* (2013.01); *B01J 37/031* (2013.01); *B01J 37/04* (2013.01); *B01J 37/08* (2013.01); *C10G 47/20* (2013.01); *B01J 2029/062* (2013.01); *C10G 2300/202* (2013.01); *C10G 2300/301* (2013.01); *C10G 2300/308* (2013.01)

(58) Field of Classification Search
CPC .... B01J 35/635; B01J 35/647; B01J 37/0018; B01J 37/031; B01J 37/04; B01J 37/08; B01J 2029/062; B01J 35/638; B01J 35/70; B01J 37/088; B01J 37/10; B01J 2229/40; B01J 2229/42; C10G 47/20; C10G 2300/202; C10G 2300/301; C10G 2300/308; C10G 65/12
See application file for complete search history.

(56) References Cited

U.S. PATENT DOCUMENTS

| | | | |
|---|---|---|---|
| 11,213,810 | B1 | 1/2022 | Ding et al. |
| 2012/0258852 | A1 | 10/2012 | Martinez et al. |
| 2020/0156052 | A1* | 5/2020 | Eid ................ B01J 35/647 |
| 2021/0213432 | A1* | 7/2021 | Fan ................ C07C 2/06 |
| 2022/0001363 | A1 | 1/2022 | Ding et al. |

OTHER PUBLICATIONS

Ding et al., "Effect of agitation on the synthesis of zeolite beta and its synthesis mechanism in absence of alkali cations", Microporous and Mesoporous Materials, vol. 94, pp. 1-8, 2006.

Ding et al., "LCO hydrotreating with Mo—Ni and W—Ni supported on nano- and micro-sized zeolite beta", Applied Catalysis A: General, vol. 353, pp. 17-23, 2009.

Kim et al., "Oligomerization and isomerization of dicyclopentadiene over mesoporous materials produced from zeolite beta", Catalysis Today, vol. 232, pp. 69-74, 2014.

Prokesova et al., "Preparation of nanosized micro/mesoporous composites via simultaneous synthesis of Beta/MCM-48 phases", Microporous and Mesoporous Materials, vol. 64, pp. 165-174, 2003.

Notification of Transmittal of the International Search Report and the Written Opinion of the International Searching Authority, or the Declaration dated Mar. 4, 2024 pertaining to International application No. PCT/US2023/077858 filed Oct. 26, 2023, pp. 1-20.

Jin, Yingjie et al. "Synthesis of mesoporous MOR materials by varying temperature crystallizations and combining ternary organic templates" Microporous and Mesoporous Materials, vol. 147, No. 1, Jun. 23, 2011, pp. 259-266.

Deneyer, Aron et al. "Zeolite Synthesis under Nonconventional Conditions: Reagents, Reactors, and Modi Operandi" Chemistry of Materials, Apr. 30, 2020, vol. 32, No. 12, pp. 4884-4919.

Feng, Rui et al. "Two-stage glucose-assisted crystallization of ZSM-5 to improve methanol to propylene (MTP)" Microporous and Mesoporous Materials, vol. 270, May 7, 2018, pp. 57-66.

Kerstens, Dorien et al. "State of the Art and Perspectives of Hierarchical Zeolites: Practical Overview of Synthesis Methods and Use in Catalysis" Advanced Materials, vol. 32, No. 44, Sep. 23, 2020, pp. 1-47.

Liu, Baoyu et al. "Fabrication of a hierarchically structured beta zeolite by a dual-porogenic surfactant" Journal of Materials Chemistry, vol. 22, No. 35, Jul. 13, 2012, pp. 18631-18638.

Serrano, D. P. et al. "Synthesis strategies in the search for hierarchical zeolites" Chemical Society Reviews, vol. 42, No. 9, Jan. 1, 2013, p. 4004-4035.

* cited by examiner

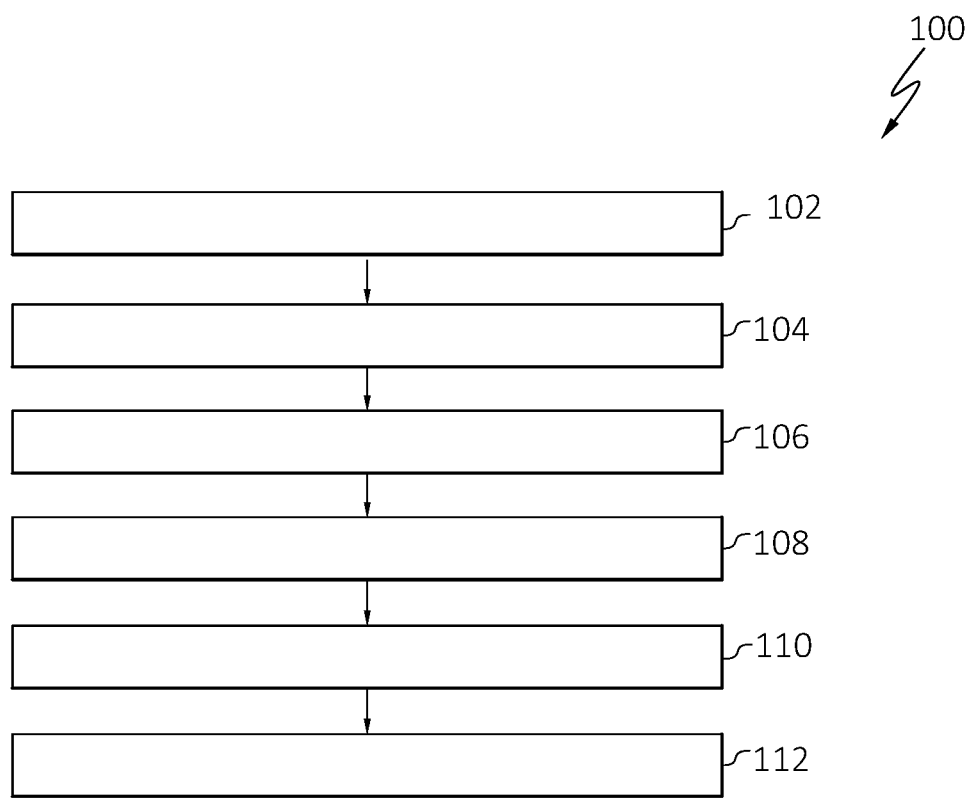

METHODS OF PRODUCING CATALYST COMPOSITIONS, AND METHODS OF CRACKING HYDROCARBON FEED STREAMS USING SUCH CATALYST COMPOSITIONS

FIELD

Embodiments disclosed herein generally relate to chemical processing and, more specifically, to methods for producing catalyst compositions.

TECHNICAL BACKGROUND

Hydrocracking is a versatile catalytic process that converts heavy oils to lighter products by aromatic saturation, cracking, and isomerization reactions in the presence of hydrogen. These hydrocracking treatments require hydrocracking catalysts which can at least partially crack the large molecules present in the heavy oils. For example, naphthenes and polyaromatics may be partially converted in a hydrocracking process. Many hydrocracking catalysts utilize a zeolite as support material. However, there are limitations in heavy oil conversion and stability of these catalysts. For example, conventional hydrocracking catalysts may have poor polyaromatic cracking conversion. Accordingly, new zeolite-based catalysts with various improved attributes are needed.

BRIEF SUMMARY

There is a need for methods of cracking hydrocarbon feeds with, in some embodiments, improved selectivity, as well as new methods of producing catalyst compositions. Conventional catalysts may be formed by processes that utilized a calcination of a zeolitic material prior to formation of the catalyst by extrusion. Presently discovered, and included in the embodiments described herein, are methods in which catalyst compositions are produced by calcining an extrudate (i.e., a material that has been extruded). Such embodiments may form catalysts that may have improved efficiency in hydrocarbon cracking.

According to one or more embodiments, a method for producing a catalyst composition may comprise forming a precursor solution comprising a silicon-containing material, an aluminum-containing material, and a quaternary amine, hydrothermally treating the precursor solution at a first temperature to form an intermediate mixture, hydrothermally treating the intermediate mixture at a second temperature to form beta zeolite, wherein the first temperature is less than the second temperature by at least 200° C., forming an extrudable mixture comprising the beta zeolite, alumina, a metal precursor, and a binder, extruding the extrudable mixture to form extrudates, and calcining the extrudates to form the catalyst composition.

This summary is provided to introduce a selection of concepts that are further described in the detailed description. This summary is not intended to identify key or essential features of the claimed subject matter, nor is it intended to be used as an aid in limiting the scope of the claimed subject matter.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawing, in which:

FIG. 1 is a method flow diagram, according to one or more embodiments shown and described herein.

Reference will now be made in greater detail to various embodiments, some embodiments of which are illustrated in the accompanying drawing.

DETAILED DESCRIPTION

Presently described, according to one or more embodiments, are methods for producing catalyst compositions. As used in this disclosure, a "catalyst composition" refers to any substance that increases the rate of a specific chemical reaction. Catalyst compositions described in this disclosure may be utilized to promote various reactions, such as, but not limited to, cracking of a hydrocarbon feed stream.

Turning now to FIG. 1, a method 100 for producing a catalyst composition is depicted. As depicted, FIG. 1 includes a series of "blocks" which are each representative of one or more steps in the processes presently described. Generally, the process steps, indicated and sometimes referred to as blocks herein, are ordered as depicted in FIG. 1. The process of FIG. 1 generally includes forming a precursor solution (at block 102), hydrothermally treating the precursor solution at a first temperature to form an intermediate mixture (at block 104), hydrothermally treating the intermediate mixture at a second temperature to form beta zeolite (at block 106), forming an extrudable mixture (at block 108), extruding the extrudable mixture to form extrudates (at block 110), and calcining the extrudates to form the catalyst composition (at block 112).

As described herein, at block 102, the method may include forming a precursor solution comprising a silicon-containing material, an aluminum-containing material, and a quaternary amine.

In embodiments, the silicon-containing material can comprise $SiO_2$, sodium silicate, tetramethylsiloxane, tetraethylsiloxane, silicon salt, silicon alkoxide, fumed silica, or combinations thereof. In embodiments, the silicon-containing material can be selected from the group consisting of $SiO_2$, sodium silicate, tetramethylsiloxane, tetraethylsiloxane, silicon salt, silicon alkoxide, fumed silica, and combinations thereof.

In embodiments, the aluminum-containing material may comprise aluminum nitrate, aluminum sulfate, aluminum alkoxide, other aluminum salts, or combinations thereof. In embodiments, the aluminum-containing material may be selected from the group consisting of aluminum nitrate, aluminum sulfate, aluminum alkoxide, other aluminum salts, and combinations thereof.

In embodiments, the quaternary amine may comprise tetraethylammonium hydroxide, tetraethylammonium bromide, or combinations thereof. In embodiments, the quaternary amine may be selected from the group consisting of tetraethyl ammonium hydroxide, tetraethylammonium bromide, and combinations thereof.

In embodiments, the precursor solution may be formed by combining at least the silicon-containing material, the aluminum-containing material, and the quaternary amine in any combination and in any order. For instance, in embodiments, the silicon-containing material and a first portion of the quaternary amine may be mixed to form a first mixture, and the aluminum-containing material and a second portion of the quaternary amine may be mixed to form a second mixture. The first mixture and second mixture may be mixed to form the precursor solution.

In embodiments, the precursor solution may comprise of from 20 weight percent (wt. %) to 50 wt. % of the silicon-containing material, based on the total weight of the precursor solution. For instance, the precursor solution may comprise of from 20 wt. % to 40 wt. %, from 20 wt. % to 30 wt. %, from 30 wt. % to 50 wt. %, from 30 wt. % to 40 wt. %, or from 40 wt. % to 50 wt.$ of the silicon-containing material.

In embodiments, the precursor solution may comprise of from 0.2 wt. % to 1 wt. % of the aluminum-containing material, based on the total weight of the precursor solution. For instance, the precursor solution may comprise of from 0.2 wt. % to 0.9 wt. %, from 0.2 wt. % to 0.8 wt. %, from 0.2 wt. % to 0.7 wt. %, from 0.2 wt. % to 0.6 wt. %, from 0.2 wt. % to 0.5 wt. %, from 0.2 wt. % to 0.4 wt. %, from 0.2 wt. % to 0.3 wt. %, from 0.3 wt. % to 1 wt. %, from 0.3 wt. % to 0.9 wt. %, from 0.3 wt. % to 0.8 wt. %, from 0.3 wt. % to 0.7 wt. %, from 0.3 wt. % to 0.6 wt. %, from 0.3 wt. % to 0.5 wt. %, from 0.3 wt. % to 0.4 wt. %, from 0.4 wt. % to 1 wt. %, from 0.4 wt. % to 0.9 wt. %, from 0.4 wt. % to 0.8 wt. %, from 0.4 wt. % to 0.7 wt. %, from 0.4 wt. % to 0.6 wt. %, or from 0.4 wt. % to 0.5 wt. % of the aluminum-containing material.

In embodiments, the precursor solution may comprise of from 20 wt. % to 60 wt. % of the quaternary amine, based on the total weight of the precursor solution. For instance, the precursor solution may comprise of from 20 wt. % to 50 wt. %, from 20 wt. % to 40 wt. %, from 20 wt. % to 30 wt. %, from 30 wt. % to 60 wt. %, from 30 wt. % to 50 wt. %, from 30 wt. % to 40 wt. %, from 40 wt. % to 60 wt. %, from 40 wt. % to 50 wt. %, or from 50 wt. % to 60 wt. % of the quaternary amine.

As described herein, at block 104, the method 100 may include hydrothermally treating the precursor solution at a first temperature to form an intermediate mixture. As used herein, "hydrothermally treating" may refer to heating a material in the presence of steam and less than 2% oxygen. In embodiments, the hydrothermal treatment may produce self-generated steam from water contained in the material. In other embodiments, additional moisture may be applied during the hydrothermal treatment. In embodiments, the first temperature can be of from 100° C. to 150° C.

In embodiments, hydrothermally treating the precursor solution may comprise exposing the precursor solution to the first temperature for a duration of at least 1 hour (hr). In embodiments, hydrothermally treating the precursor solution may comprise exposing the precursor solution to the first temperature for a duration of from 1 hr to 7 days. Without intending to be bound by any particular theory, it is believed that hydrothermally treating the precursor solution at a temperature greater 150° C., may cause the quaternary amine to decompose, which may reduce zeolite formation. In embodiments, hydrothermally treating the precursor solution may comprise exposing the solution to a steam pressure of from 1 bar to 10 bar. Without intending to be bound by any particular theory, it is believed that the intermediate mixture may comprise beta zeolite. Further, it is believed that at least a portion of the quaternary amine may be present in the pores of the beta zeolite.

In embodiments, the intermediate mixture can be processed before a second hydrothermal treatment. For instance, in embodiments the zeolite intermediate can be washed with a solution, such as water. In embodiments, the intermediate mixture can be cooled to a temperature below the first temperature. In embodiments, the intermediate mixture may be processed by purification, such as but not limited to centrifugation.

As described herein, at block 106, the method 100 may include hydrothermally treating the intermediate mixture at a second temperature to form beta zeolite. In embodiments, the first temperature may be less than a second temperature by at least 200° C., at least 250° C., or even at least 300° C. In embodiments, the second temperature may be of from 500° C. to 650° C., such as from 500° C. to 600° C., from 500° C. to 575° C., from 525° C. to 650° C., from 525° C. to 600° C., or from 525° C. to 575° C.

In embodiments, hydrothermally treating the intermediate mixture may comprise exposing the intermediate mixture to the second temperature for a duration of at least 10 minutes (min). In embodiments, hydrothermally treating the intermediate mixture may comprise exposing the intermediate mixture to the second temperature for a duration of from 10 min to 1 day, such as from 10 min to 12 hours (hr), from 10 min to 6 hr, from 10 min to 4 hr, from 10 min to 2 hr, from 30 min to 12 hr, from 30 min to 6 hr, from 30 min to 4 hr, or from 30 min to 2 hr.

In embodiments, hydrothermally treating the intermediate mixture may comprise exposing the intermediate mixture to a steam pressure of from 1 bar to 5 bars.

Without intending to be bound by any particular theory, it is believed that hydrothermally treating the intermediate mixture as described herein, may result in the conversion of at least a portion of the quaternary amine in the pores of the precursor solution to coke, rather than burning off in the presence of oxygen. Further, it is believed that a least a portion of the coke may remain in the pores of the intermediate mixture, or zeolitic product derived therefrom, until the material is calcined.

Surface area, pore volume, average pore size, and pore size distribution may be measured by $N_2$ adsorption isotherms performed at 77 Kelvin (K) (such as with a Micrometrics ASAP 2020 system). As would be understood by those skilled in the art, Brunauer, Emmett, and Teller (BET) analysis methods may be utilized to calculate the surface area, and the Barrett, Joyner and Halenda (BJH) calculation may be used to determine pore volume and pore size distribution.

In embodiments, the beta zeolite may have a surface area of greater than or equal to 400 $cm^2/g$, such as greater than or equal to 450 $cm^2/g$, or greater than or equal to 500 $cm^2/g$. In embodiments, the beta zeolite may have a surface of from 400 $cm^2/g$ to 700 $cm^2/g$, such as from 400 $cm^2/g$ to 600 $cm^2/g$, from 400 $cm^2/g$ to 550 $cm^2/g$, from 450 $cm^2/g$ to 700 $cm^2/g$, from 450 $cm^2/g$ to 650 $cm^2/g$, from 450 $cm^2/g$ to 600 $cm^2/g$, from 450 $cm^2/g$ to 550 $cm^2/g$, from 500 $cm^2/g$ to 700 $cm^2/g$, from 500 $cm^2/g$ to 650 $cm^2/g$, from 500 $cm^2/g$ to 600 $cm^2/g$, or from 500 $cm^2/g$ to 550 $cm^2/g$. The surface area is determined using BET analysis.

In embodiments, the beta zeolite may have a mesopore volume of greater than 0.5 mL/g, such as greater than 0.6 mL/g, or greater than 0.7 mL/g. In embodiments, the beta zeolite may have a mesopore volume of from 0.5 mL/g to 2.0 mL/g, such as from 0.5 mL/g to 1.5 mL/g, from 0.5 mL/g to 1.25 mL/g, from 0.75 mL/g to 2.0 mL/g, from 0.75 mL/g to 1.5 mL/g, or from 0.75 mL/g to 1.25 mL/g. The mesopore volume is determined using BJH analysis.

In embodiments, the beta zeolite may have a micropore volume of greater than 0.1 mL/g. In embodiments, the beta zeolite may have a micropore volume of from 0.1 mL/g to 0.5 mL/g, such as from 0.1 mL/g to 0.4 mL/g, from 0.1 mL/g to 0.3 mL/g, or from 0.1 mL/g to 0.2 mL/g. The micropore volume is determined using BJH analysis.

In embodiments, the beta zeolite may have an average pore size of greater than 3 nm, greater than 4 nm, greater than 5 nm, greater than 6 nm, greater than 7 nm, or even greater than 8 nm, as determined by BET analysis. In embodiments, the catalyst composition may have an average pore size of from 3 nm to 15 nm, such as from 3 nm to 12 nm, from 3 nm to 10 nm, from 3 nm to 9 nm, from 4 nm to 15 nm, from 4 nm to 12 nm, from 4 nm to 10 nm, from 4 nm to 9 nm, from 5 nm to 15 nm, from 5 nm to 12 nm, from 5 nm to 10 nm, from 5 nm to 9 nm, from 6 nm to 15 nm, from 6 nm to 12 nm, from 6 nm to 10 nm, or from 6 nm to 9 nm. The average pore size is determined using BJH analysis.

In embodiments, the beta zeolite may have a crystallinity of at least 70%, at least 75%, at least 80%, at least 85%, or even at least 90% of the crystallinity of a commercialized and relatively well crystallized beta zeolite (for example, CP814E from Zeolyst). Greater crystallinity may impart increased stability to the zeolite, especially when exposed to elevated temperatures such as those in heavy oil pretreatment or other catalytic processes. The crystallinity may be measured with XRD (X-ray Diffraction). The commercialized and relatively well crystallized beta zeolite may be taken as the reference at 100% crystallinity. From XRD spectra, the five most intensive peaks are integrated. The sample relative crystallinity is calculated based on the following equation: X (%)=100%×$\Sigma A / \Sigma A_0$, where A is the sum of the five peak total area of the fabricated samples; $A_0$ is the sum of the five peak total area of the reference sample.

In embodiments, the beta zeolite is not calcined before extruding the extrudable mixture. As used herein, "calcining" may refer to heating a material to an elevated temperature, and holding the temperature of the material at an elevated temperature for a duration of time in an environment comprising at least 5 wt. % oxygen. This step is different from conventional methods that include calcining beta zeolite before forming a catalyst composition comprising beta zeolite. Without intending to be bound by any particular theory, it is believed that by not calcining the beta zeolite, the coke formed in block 104 may remain in the pores of the beta zeolite, until calcined at a later step in the method 100, which may increase the mesoporosity of the catalyst composition formed therefrom.

As described herein, at block 108, the method 100 may include forming an extrudable mixture comprising the beta zeolite, alumina, a metal precursor, and a binder. In embodiments, the extrudable mixture may be formed by comulling beta zeolite with other components. In embodiments, the beta zeolite, a metal precursor (for example nickel nitrate) alumina (for example, an active alumina, boehmite alumina), and binder (for example, acid peptized alumina) may be mixed. An appropriate amount of water may be added to form a dough that can be extruded using an extruder.

Without intending to be bound by any particular theory, it is believed that by mixing the beta zeolite, which has not been calcined and has coke blocking at least a portion of the pores of the beta zeolite, the metals from the metal precursor may not occupy a portion of the pores that are blocked by coke. Upon calcination of the extrudates formed therefrom, at least a portion of the coke may be burned off, yielding a catalyst composition that may have increased mesoporosity compared to conventional methods that calcine the beta zeolite and then add metals to the beta zeolite. That is, conventional methods that calcine beta zeolite and then impregnate metals into the beta zeolite may yield a catalyst composition that is less mesoporous than the catalyst compositions described herein.

In embodiments, the extrudable mixture may further comprise a zeolite Y (that is, a zeolite having an aluminosilicate FAU framework type). Without intending to be bound by any particular theory, it is believed that the addition of a zeolite Y in addition to the beta zeolite may provide additional hydrocracking ability to the catalyst composition derived therefrom, compared to catalyst compositions that do not include zeolite Y.

In embodiments, the extrudable mixture may comprise of from 2 wt. % to 60 wt. % of zeolites, based on the total weight of the extrudable mixture. For instance, in embodiments, the extrudable mixture may comprise of from 2 wt. % to 50 wt. %, from 2 wt. % to 40 wt. %, from 2 wt. % to 30 wt. %, from 10 wt. % to 60 wt. %, from 10 wt. % to 50 wt. %, from 10 wt. % to 40 wt. %, from 10 wt. % to 30 wt. %, from 20 wt. % to 60 wt. %, from 20 wt. % to 50 wt. %, from 20 wt. % to 40 wt. %, or from 20 wt. % to 30 wt. % zeolites, based on the total weight of the extrudable mixture.

In embodiments, the alumina may have an average pore volume of from 0.5 mL/g to 1.2 mL/g. For instance, the alumina may have an average pore volume of from 0.6 mL/g to 1.2 mL/g, from 0.7 mL/g to 1.2 mL/g, from 0.8 mL/g to 1.2 mL/g, from 0.9 mL/g to 1.2 mL/g, from 1.0 mL/g to 1.2 mL/g, or from 1.1 mL/g to 1.2 mL/g.

Without intending to be bound by any particular theory, it is believed that including alumina having a larger average pore volume, such as greater than or equal to 0.5 may increase a mesoporosity of the catalyst composition formed therefrom.

In embodiments, the extrudable mixture may comprise of from 0 wt. % to 50 wt. % of the alumina, based on the total weight of the extrudable mixture.

In embodiments, the metal precursor may comprise oxides or sulfides of molybdenum, nickel, tungsten, or a combination of two or more thereof. For instance, in embodiments, the metal precursor may comprise nickel nitrate hexahydrate, ammonium metatungstate, molybdenum oxide, or combinations thereof.

In embodiments, the extrudable mixture may comprise of from 2 wt. % to 40 wt. % of the metal precursor, such as from 2 wt. % to 35 wt. %, from 2 wt. % to 30 wt. %, from 2 wt. % to 25 wt. %, from 5 wt. % to 40 wt. %, from 5 wt. % to 35 wt. %, from 5 wt. % to 30 wt. %, from 5 wt. % to 25 wt. %, from 10 wt. % to 40 wt. %, from 10 wt. % to 35 wt. %, from 10 wt. % to 30 wt. %, or from 10 wt. % to 25 wt. %, based on the total weight of the extrudable mixture.

In embodiments, the extrudable mixture may comprise of from 10 wt. % to 30 wt. % of the binder, based on the total weight of the extrudable mixture.

As described herein, at block 110, the method 100 may include extruding the extrudable mixture to form extrudates. In embodiments, the extrudates may be dried, which may include heating at an elevated temperature for a duration of time to remove at least a portion of solvent, such as water, from the extrudates. For example, the extrudates may be dried at a temperature of from 80° C. to 120° C. for a duration of time from 1 hr to 10 days.

As described herein, at block 112, the method 100 may include calcining the extrudates to form the catalyst composition. In embodiments, the extrudates may be calcined by heating the extrudates to an elevated temperature, such as from 400° C. to 700° C. for a duration of time, such as from 10 min to 5 days. In embodiments, the extrudates may be calcined in an environment comprising at least 5 wt. % oxygen, such as at least 10 wt. % oxygen, or from 5 wt. % to 40 wt. % oxygen based on the total composition of gases in the environment where the extrudates are calcined, such as an oven.

Without intending to be bound by any particular theory, it is believed that calcining the extrudates may remove at least a portion of the coke present in the pores of the beta zeolite, which may increase a mesoporosity of the catalyst composition. Further, it is believed that by not calcining the beta zeolite, or product derived therefrom, until after the extrudates comprising the metals are formed, the mesoporosity of the catalyst composition as described herein may be greater than a mesoporosity of catalyst compositions that are formed by calcining a beta zeolite before forming extrudates.

In embodiments, the catalyst composition may comprise from 1 wt. % to 60 wt. % zeolites, based on the total weight of the catalyst composition. For instance, in embodiments the catalyst composition may comprise from 1 wt. % to 50 wt. %, from 1 wt. % to 40 wt. %, from 1 wt. % to 30 wt. %, from 5 wt. % to 60 wt. %, from 5 wt. % to 50 wt. %, from 5 wt. % to 40 wt. %, from 5 wt. % to 30 wt. %, from 10 wt. % to 60 wt. %, from 10 wt. % to 50 wt. %, from 10 wt. % to 40 wt. %, or from 10 wt. % to 30 wt. % zeolites.

In embodiments where the catalyst composition comprises beta zeolite and the zeolite Y, the catalyst composition may comprise a weight ratio of the beta zeolite to the zeolite Y of from 1:5 to 5:1, such as from 1:5 to 2:1, from 1:5 to 1:1, or from 1:1 to 5:1.

In embodiments, the catalyst composition may comprise from 1 wt. % to 10 wt. % nickel, based on the total weight of the catalyst composition. For instance, in embodiments, the catalyst composition may comprise from 1 wt. % to 8 wt. %, from 1 wt. % to 7 wt. %, from 1 wt. % to 6 wt. %, from 1 wt. % to 5 wt. %, from 1 wt. % to 4 wt. %, from 1 wt. % to 3 wt. %, or from 1 wt. % to 2 wt. % nickel. The nickel may be in any oxidation state, such as −1, 0, +2. +3, or +4. The amount of nickel present in the catalyst composition may be determined using elemental analysis, such as mass spectrometry.

In embodiments, the catalyst composition may comprise from 1 wt. % to 20 wt. % molybdenum, based on the total weight of the catalyst composition. For instance, in embodiments, the catalyst composition may comprise from 1 wt. % to 15 wt. %, from 1 wt. % to 10 wt. %, from 1 wt. % to 5 wt. %, or from 1 wt. % to 2 wt. % molybdenum. The molybdenum may be in any oxidation state, such as 0, +2. +3, +4, +5, or +6. The amount of molybdenum present in the catalyst composition may be determined using elemental analysis, such as mass spectrometry.

In embodiments, the catalyst composition may comprise from 1 wt. % to 30 wt. % tungsten, based on the total weight of the catalyst composition. For instance, in embodiments, the catalyst composition may comprise from 1 wt. % to 25 wt. %, from 1 wt. % to 20 wt. %, from 1 wt. % to 15 wt. %, from 1 wt. % to 10 wt. %, from 1 wt. % to 5 wt. %, or from 1 wt. % to 2 wt. % tungsten. from 5 wt. % to 30 wt. %, from 5 wt. % to 25 wt. %, from 5 wt. % to 20 wt. %, from 5 wt. % to 15 wt. %, from 5 wt. % to 10 wt. %, from 10 wt. % to 30 wt. %, from 10 wt. % to 25 wt. %, from 10 wt. % to 20 wt. %, from 10 wt. % to 15 wt. %, from 15 wt. % to 30 wt. %, from 15 wt. % to 25 wt. %, from 15 wt. % to 20 wt. %, from 20 wt. % to 30 wt. %, or from 20 wt. % to 25 wt. %, The tungsten may be in any oxidation state, such as +2. +3, +4, +5, or +6. The amount of tungsten present in the catalyst composition may be determined using elemental analysis, such as mass spectrometry.

In embodiments, the catalyst composition may have a surface area of greater than or equal to 250 cm$^2$/g, or greater than or equal to 300 cm$^2$/g, as determined by BET analysis. In embodiments, the catalyst composition may have a surface area of from 250 cm$^2$/g to 450 cm$^2$/g, such as from 250 cm$^2$/g to 400 cm$^2$/g, from 250 cm$^2$/g to 350 cm$^2$/g, from 250 cm$^2$/g to 325 cm$^2$/g, from 290 cm$^2$/g to 450 cm$^2$/g, from 290 cm$^2$/g to 400 cm$^2$/g, from 290 cm$^2$/g to 350 cm$^2$/g, or from 290 cm$^2$/g to 325 cm$^2$/g.

In embodiments, the catalyst composition may have a mesopore volume of greater than or equal to 0.3 mL/g, or greater than or equal to 0.4 mL/g. In embodiments, the catalyst composition may have a mesopore volume of from 0.4 mL/g to 1.0 mL/g, such as from 0.4 mL/g to 0.9 mL/g, from 0.4 mL/g to 0.8 mL/g, from 0.4 mL/g to 0.7 mL/g, from 0.5 mL/g to 1.0 mL/g, such as from 0.5 mL/g to 0.9 mL/g, from 0.5 mL/g to 0.8 mL/g, or from 0.5 mL/g to 0.7 mL/g. The mesopore volume is determined using BJH analysis.

In embodiments, the catalyst composition may have an average pore size of greater than 3 nm, greater than 4 nm, greater than 5 nm, greater than 6 nm, greater than 7 nm, or even greater than 8 nm. In embodiments, the catalyst composition may have an average pore size of from 3 nm to 15 nm, such as from 3 nm to 12 nm, from 3 nm to 10 nm, from 3 nm to 9 nm, from 4 nm to 15 nm, from 4 nm to 12 nm, from 4 nm to 10 nm, from 4 nm to 9 nm, from 5 nm to 15 nm, from 5 nm to 12 nm, from 5 nm to 10 nm, from 5 nm to 9 nm, from 6 nm to 15 nm, from 6 nm to 12 nm, from 6 nm to 10 nm, or from 6 nm to 9 nm. The average pore size is determined using BJH analysis.

Without intending to be bound by any particular theory, it is believed that the relatively large pore size (that is, the mesoporosity) of the presently described zeolites and catalyst compositions that comprise the zeolites allows for larger molecules to diffuse inside the zeolite, which is believed to enhance the reaction activity and selectivity of the catalyst. With the increased pore size, aromatic containing molecules can more easily diffuse into the catalyst and aromatic cracking may be increased. For example, in some conventional embodiments, the feedstock converted by the catalyst compositions may be vacuum gas oils, light cycle oils from, for example, a fluid catalytic cracking reactor, or coker gas oils from, for example, a coking unit. The molecular sizes in these oils are relatively small relative to those of heavy oils such as crude oil and atmosphere residue, which may be the feedstock of the present methods and systems. The heavy oils generally may not be able to diffuse inside the conventional zeolites and be converted on the active sites located inside the zeolites. Therefore, zeolites with larger pore sizes (that is, for example, mesoporous zeolites) may allow for the larger molecules of heavy oils to overcome the diffusion limitation, and may make possible reaction and conversion of the larger molecules of the heavy oils.

In embodiments, catalyst compositions as described herein may be used in methods of cracking hydrocarbon feed streams. As used in this disclosure, "cracking" generally refers to a chemical reaction where carbon-carbon bonds are broken. For example, a molecule having carbon to carbon bonds is broken into more than one molecule by the breaking of one or more of the carbon to carbon bonds, or is converted from a compound which includes a cyclic moiety, such as a cycloalkane, cycloalkane, naphthalene, an aromatic or the like, to a compound which does not include a cyclic moiety or contains fewer cyclic moieties than prior to cracking.

In embodiments, the method of cracking a hydrocarbon feed stream may include contacting the hydrocarbon feed stream with one or more of the catalyst compositions described herein to crack at least a portion of the hydrocarbon feed stream to form a product effluent. It should be understood that a "product effluent" generally refers to a stream that exits a system component such as a reactor or reactor zone, following a particular reaction, and generally has a different composition (at least proportionally) than the stream that entered the reactor or reaction zone, such as the hydrocarbon feed stream.

In embodiments, the hydrocarbon feed stream may be a crude oil. As used in the present disclosure, the term "crude oil" refers to a mixture of petroleum liquids and gases, including impurities, such as sulfur-containing compounds, nitrogen-containing compounds, and metal compounds, extracted directly from a subterranean formation or received from a desalting unit without having any fractions, such as naphtha, separated by distillation. In other embodiments, the crude oil may be processed, such as hydrotreated, and/or separated by distillation, and the hydrocarbon feed stream may comprise a processed stream of the crude oil.

In embodiments, the hydrocarbon feed stream may be hydrotreated before the contacting.

In embodiments, the hydrocarbon feed stream may comprise at least 5,000 parts per million by weight (ppmw), at least 10,000 ppmw, or even at least 15,000 ppmw sulfur, based on the total weight of the hydrocarbon feed stream. In embodiments, the hydrocarbon feed stream may comprise of from 5,000 ppmw to 40,000 ppmw sulfur, such as from 5,000 ppmw to 30,000 ppmw, from 5,000 ppmw to 25,000 ppmw, from 5,000 ppmw to 20,000 ppmw, from 10,000 ppmw to 40,000 ppmw, from 10,000 ppmw to 30,000 ppmw, from 10,000 ppmw to 25,000 ppmw, or from 10,000 ppmw to 20,000 ppmw sulfur.

In embodiments, the hydrocarbon feed stream may comprise at least 500 ppmw, at least 1,000 ppmw, or even at least 1,200 ppmw nitrogen, based on the total weight of the hydrocarbon feed stream. In embodiments, the hydrocarbon feed stream may comprise of from 500 ppmw to 4,000 ppmw nitrogen, such as from 500 ppmw to 3,000 ppmw, from 500 ppmw to 2,500 ppmw, from 500 ppmw to 2,000 ppmw, from 1,000 ppmw to 4,000 ppmw, from 1,000 ppmw to 3,000 ppmw, from 1,000 ppmw to 2,500 ppmw, from 1,000 ppmw to 2,000 ppmw, or from 1,000 ppmw to 1,500 ppmw nitrogen.

In embodiments, at least 50 wt. %, at least 55 wt. %, at least 60 wt. %, at least 65 wt. % or even at least 70 wt. % of the hydrocarbon feed stream may have a boiling point of greater than 500° C.

In embodiments, at least 10 wt. %, at least 15 wt. %, or at least 20 wt. % of the hydrocarbon feed stream may have a boiling point of greater than 1,000° C.

In embodiments, the product effluent may comprise greater than or equal to 40 wt. % naphtha based on the total weight of the product effluent. As used in this disclosure, "naphtha" refers to an intermediate mixture of hydrocarbon-containing materials derived from crude oil refining and having atmospheric boiling points from 25° C. to 180° C. For instance, the product effluent may comprise greater than or equal to 45 wt. %, greater than or equal to 50 wt. %, greater than or equal to 55 wt. %, greater than or equal to 60 wt. %, or even greater than or equal to 65 wt. % naphtha. In embodiments, the product effluent may comprise of from 40 wt. % to 80 wt. % naphtha, such as from 40 wt. % to 70 wt. %, from 50 wt. % to 80 wt. %, from 50 wt. % to 70 wt. %, from 60 wt. % to 80 wt. %, from 60 wt. % to 70 wt. %, or from 65 wt. % to 70 wt. % naphtha.

Without intending to be bound by any particular theory, it is believed that the zeolite compositions and catalyst compositions described herein may be used to crack a hydrocarbon feed stream and produce a product effluent having a greater amount of naphtha compared to methods using conventional catalysts.

It should be understood that an "effluent" generally refers to a stream that exits a system component such as a separation unit, a reactor, or reaction zone, following a particular reaction or separation, and generally has a different composition (at least proportionally) than the stream that entered the separation unit, reactor, or reaction zone.

A first aspect of the present disclosure is directed to a method for producing a catalyst composition, the method may comprise forming a precursor solution comprising a silicon-containing material, an aluminum-containing material, and a quaternary amine, hydrothermally treating the precursor solution at a first temperature to form an intermediate mixture, hydrothermally treating the intermediate mixture at a second temperature to form beta zeolite, wherein the first temperature is less than the second temperature by at least 200° C., forming an extrudable mixture comprising the beta zeolite, alumina, a metal precursor, and a binder, extruding the extrudable mixture to form extrudates, and calcining the extrudates to form the catalyst composition.

A second aspect of the present disclosure may include the first aspect, wherein the beta zeolite is not calcined before extruding the extrudable mixture.

A third aspect of the present disclosure may include either one of the first or second aspects, wherein the intermediate mixture is not dried before forming the beta zeolite.

A fourth aspect of the present disclosure may include any one of the first through third aspects, wherein the silicon-containing material comprises $SiO_2$, sodium silicate, tetramethylsiloxane, tetraethylsiloxane, silicon salt, silicon alkoxide, fumed silica, or combinations thereof.

A fifth aspect of the present disclosure may include any one of the first through fourth aspects, wherein the aluminum-containing material comprises aluminum nitrate, aluminum sulfate, aluminum alkoxide, other aluminum salts, or combinations thereof.

A sixth aspect of the present disclosure may include any one of the first through fifth aspects, wherein the quaternary amine comprises tetraethyl ammonium hydroxide, tetraethylammonium bromide, or combinations thereof.

A seventh aspect of the present disclosure may include any one of the first through sixth aspects, wherein the first temperature is of from 100° C. to 150° C.

An eighth aspect of the present disclosure may include any one of the first through seventh aspects, wherein the second temperature is of from 500° C. to 650° C.

A ninth aspect of the present disclosure may include any one of the first through eighth aspects, further comprising cooling the intermediate mixture before hydrothermally treating the intermediate mixture.

A tenth aspect of the present disclosure may include any one of the first through ninth aspects, further comprising washing the intermediate mixture before hydrothermally treating the zeolite intermediate.

An eleventh aspect of the present disclosure may include any one of the first through tenth aspects, wherein the metal precursor comprises molybdenum, nickel, tungsten, or combinations of two or more thereof.

A twelfth aspect of the present disclosure may include any one of the first through eleventh aspects, wherein the extrudable mixture further comprises a zeolite Y.

A thirteenth aspect of the present disclosure may include any one of the first through twelfth aspects, wherein the beta zeolite has a surface area of greater than or equal to 400 cm$^2$/g.

A fourteenth aspect of the present disclosure may include any one of the first through thirteenth aspects, wherein one or more of: the beta zeolite has a mesopore volume of greater than 0.5 mL/g; the beta zeolite has a micropore volume of greater than 0.1 mL/g; the beta zeolite has an average pore size of greater than 3 nanometers; the beta zeolite has a crystallinity of at least 70% as measured using x-ray diffraction; the catalyst composition has a surface area of greater than or equal to 250 cm$^2$/g; the catalyst composition has a mesopore volume of greater than 0.4 mL/g; or the catalyst composition has an average pore size of greater than 3 nanometers.

A fifteenth aspect of the present disclosure may be directed to a method of cracking a hydrocarbon feed stream comprising contacting the hydrocarbon feed stream with the catalyst composition of any of the first through fourteenth aspects to crack at least a portion of the hydrocarbon feed stream to form a product effluent A sixteenth aspect of the present disclosure may include the fifteenth aspect, wherein the hydrocarbon feed stream is crude oil.

A seventeenth aspect of the present disclosure may include any one of the fifteenth and sixteenth aspects, wherein the hydrocarbon feed stream is hydrotreated before the contacting.

An eighteenth aspect of the present disclosure may include any one of the fifteenth through seventeenth aspects, wherein the product effluent comprises at least 40 wt. % naphtha.

A nineteenth aspect of the present disclosure is directed to a method of producing a catalyst composition, the method may comprise forming a precursor solution comprising a silicon-containing material, an aluminum-containing material, and a quaternary amine, hydrothermally treating the precursor solution at a first temperature to form an intermediate mixture, hydrothermally treating the intermediate mixture at a second temperature to form beta zeolite, wherein the first temperature is less than the second temperature by at least 200° C., forming an extrudable mixture comprising the beta zeolite, alumina, a metal precursor, and a binder, extruding the extrudable mixture to form extrudates, and calcining the extrudates to form the catalyst composition, wherein the beta zeolite is not calcined before extruding the extrudable mixture, the silicon-containing material comprises fumed silica, the quaternary amine comprises tetraethylammonium hydroxide, the first temperature is of from 100° C. to 150° C., the second temperature is of from 500° C. to 650° C., and the metal precursor comprises molybdenum and nickel.

A twentieth aspect of the present disclosure may include the nineteenth aspect, wherein the extrudable mixture further comprises a zeolite Y.

EXAMPLES

The various embodiments disclosed herein will be further clarified by the following examples. The examples are illustrative in nature, and should not be understood to limit the embodiments disclosed herein.

Comparative Example A—Synthesis of Comparative Beta Zeolite

The beta zeolite of Comparative Example A was synthesized as follows: an aluminosilicate (Al—Si) precursor gel was prepared from an aluminum (Al) solution and a silica slurry. Specifically, the Al solution was prepared by mixing metal aluminum powder (0.27 g, Sigma Aldrich) with tetraethylammonium hydroxide (TEAOH) (25 g, 35% aqueous solution, Sigma Aldrich) at room temperature and stirred until completely dissolved. The silica slurry was prepared by mixing fumed silica (Aerosil® 200, Degussa) (15 g), TEAOH (38 g, 35% aqueous solution), and purified water (4.05 g). The Al solution was added to the silica slurry to form the Al—Si precursor gel. The Al—Si precursor gel was stirred at room temperature for 4 hours and transferred to a PTFE lined stainless steel autoclave. The autoclave was sealed, placed in an oven rotating at 60 rpm at 140° C. and 100% steam environment for 3 days. The mixture was quenched with cold tap water for 1 hour. The product was washed in a high-speed centrifuge until the pH level reached about 9.0 to obtain a solid product. The solid product was dried in an oven at 110° C. overnight and then calcined in air at 550° C. for 4 hours at a ramp rate of 2° C./min. The product is denoted Comparative Example A.

Comparative Example B—Synthesis of Comparative Hydrocracking Catalyst Comprising Comparative Nano-Zeolite Beta The hydrocracking catalyst of Comparative Example B was prepared using the comparative beta zeolite of Comparative Example A. Specifically, MoO$_3$ (15 g), Ni(NO$_3$)$_2$.6H$_2$O (20 g), Comparative Example A (50 g), large pore alumina (10 g, dry-based, Puralox HP 14/150 SasoL), and binder (100 g, prepared from 20 g dry-based alumina Capatal alumina from Sasol, acid peptized with 7 wt. % HNO$_3$) were mixed to form an extrudable mixture. The extrudable mixture was extruded to form 1.8-mm, cylindrical shaped extrudates. The extrudates were dried at 110° C. overnight and then calcined at 500° C. for 4 hours at a ramp rate of 2° C./min. The product is denoted Comparative Example B.

Comparative Example C—Synthesis of Comparative Hydrocracking Catalyst Comprising Comparative Beta Zeolite and Meso-Y The hydrocracking catalyst of Comparative Example C was prepared using a composite of beta zeolite from Comparative Example A and hierarchical zeolite Y (Meso-Y) (CBV-760 from Zeolyst). Specifically, MoO$_3$ (15 g), Ni(NO$_3$)$_2$.6H$_2$O (20 g), Meso-Y (30 g), Comparative Example A (20 g), large pore alumina (10 g), and binder (100 g) were mixed to form an extrudable mixture. The extrudable mixture was extruded to form 1.8-mm, cylindrical shaped extrudates. The extrudates were dried at 110° C. overnight and then calcined at 500° C. for 4 hours at ramp of 2° C./min. The product is denoted Comparative Example C.

Example 1—Synthesis of Beta Zeolite

The beta zeolite of Example 1 was synthesized as follows: an Al—Si precursor gel was prepared from an Al solution and a silica slurry. Specifically, the Al solution was prepared by mixing metal Al powder (0.27 g) with TEAOH at room temperature and stirred until completely dissolved. The silica slurry was prepared by mixing fumed silica (15 g), TEAOH (38 g, 35% aqueous solution), and purified water (4.05 g). The Al solution was added to the silica slurry to form the Al—Si precursor gel. The Al—Si precursor gel was stirred at room temperature for 4 hours and transferred to a PTFE lined stainless steel autoclave. The Al—Si precursor gel was hydrothermally treated. Specifically, the autoclave was sealed, placed in an oven rotating at 60 rpm at 140° C. and 100% steam environment for 3 days. The mixture was quenched with cold tap water for 1 hour. The product was washed in a high-speed centrifuge until the pH level reached about 9.0 to obtain a washed product. The washed product was hydrothermally treated in an autoclave. Specifically, the hydrothermal treatment was carried out in the autoclave with the temperature of the autoclave increased to 550° C. and maintained at 550° C. for 1 hour. The steam pressure in the autoclave was maintained at 1-2 bar. The product is denoted Example 1.

Example 2—Synthesis of a Hydrocracking Catalyst Comprising Beta Zeolite

The hydrocracking catalyst of Example 2 was prepared using the beta zeolite of Example 1. Specifically, $MoO_3$ (15 g), $Ni(NO_3)_2 \cdot 6H_2O$ (20 g), Example 1 (50 g), large pore alumina (10 g), and binder (100 g) were mixed to form an extrudable mixture. The extrudable mixture was extruded to form 1.8-mm, cylindrical shaped extrudates. The extrudates were dried at 110° C. overnight and then calcined at 500° C. for 4 hours at a ramp of 2° C./min. The product is denoted Example 2.

Example 3—Synthesis of Hydrocracking Catalyst Comprising Beta Zeolite and Meso-Y The hydrocracking catalyst of Example 3 was prepared using a composite of beta zeolite from Example 1 and Meso-Y. Specifically, $MoO_3$ (15 g), $Ni(NO_3)_2 \cdot 6H_2O$ (20 g), Meso-Y (30 g), Example 1 (20 g), large pore alumina (10 g), and binder (100 g) were mixed to form an extrudable mixture. The catalytic mixture was extruded to form 1.8-mm, cylindrical shaped extrudates. The extrudates were dried at 110° C. overnight and then calcined at 500° C. for 4 hours at ramp of 2° C./min. The product is denoted Example 3.

Example 4—Analysis of Beta Zeolite of Example 1 and Comparative Example A

The properties of Example 1 and Comparative Example A were evaluated. Table 1 discloses the properties of Example 1 and Comparative Example A. Example 1 had a measured XRD crystallinity of 108% referenced to Comparative Example A. Example 1 also had increased mesopore volume and average pore size, relative to Comparative Example A. These result confirm the that methods described herein may yield a beta zeolite having a greater mesopore volume and average pore size compared to conventional methods.

TABLE 1

| Sample Name | Comp. Ex. A | Ex. 1 |
|---|---|---|
| XRD crystallinity, % | 100 | 108 |
| Surface area, m²/g | 590 | 540 |
| Pore volume, mL/g | 0.83 | 1.19 |
| Micropore, mL/g | 0.15 | 0.16 |
| Mesopore, mL/g | 0.68 | 1.03 |
| Average pore size, nm | 2.8 | 8.8 |

Example 8—Analysis of Hydrocracking Catalysts Comprising Beta Zeolite and Optionally Zeolite Y The properties of Example 2 were compared with Comparative Example B as shown in Table 2. Example 2 had an increased surface area, mesopore volume, and pore size, relative to Comparative Example B. Example 3 had an increased surface area, mesopore volume, and pore size, relative to Comparative Example C. These results confirm that preparing catalyst compositions comprising beta zeolite formed, as described herein, provide catalyst compositions with improved mesoporosity. Further, the addition of an additional zeolite, such as a zeolite Y may improve mesoporosity.

TABLE 2

| Catalyst name | Comp. Ex. B | Comp. Ex. C | Ex. 2 | Ex. 3 |
|---|---|---|---|---|
| Surface area, m²/g | 281 | 355 | 300 | 362 |
| Total pore volume, ml/g | 0.52 | 0.47 | 0.66 | 0.54 |
| Micropore volume, ml/g | 0.03 | 0.10 | 0.03 | 0.12 |
| Mesopore volume, ml/g | 0.49 | 0.37 | 0.63 | 0.42 |
| Pore size, nm | 7.4 | 5.3 | 8.8 | 6.7 |

Example 9—Evaluation of Catalytic Performance Using the Hydrocracking Catalysts

The catalysts of Example 2, Example 3, Comparative Example B, and Comparative Example C were evaluated in pilot plant units for hydrocracking oil. Arabia light crude oil was used as the feedstock. Table 3 discloses the properties of Arabia light crude oil used herein. The feedstock was hydrotreated in a first reactor using hydrotreating catalysts (KFR-70 from Albemarle company). The first reactor was maintained at a pressure of 150 bar, a temperature of 390° C., a liquid hourly space velocity (LHSV) of 0.2 $h^{-1}$, and a $H_2$/oil volume ratio of 1200:1. The hydrotreated product was send to a second reactor with one of the catalysts of Example 2, Example 3, Comparative Example B, and Comparative Example C. The second reactor was maintained at a pressure of 150 bar, a temperature of 390° C., a liquid hourly space velocity (LHSV) of 1.5 $h^{-1}$, and a $H_2$/oil volume ratio of 1200:1.

TABLE 3

| | |
|---|---|
| Density @ 60° F. | 0.8861 |
| Sulfur, ppm | 18510 |
| Nitrogen, ppm | 1308.3 |
| SimDis, ° F. | |
| IBP | 152 |
| 5% | 270 |
| 10% | 330 |
| 20% | 425 |
| 30% | 516 |

TABLE 3-continued

| | |
|---|---|
| 40% | 606 |
| 50% | 702 |
| 60% | 803 |
| 70% | 919 |
| 80% | 1066 |
| 90% | 1302 |
| 95% | 1327 |
| FBP | 1327 |

The catalytic performance of the catalysts containing beta zeolite and beta zeolite with zeolite Y are summarized in Table 4 and 5, respectively. As shown in Table 4, Example 2 has a higher yield of naphtha products (C5-180° C.) in comparison to Comparative Example B. As shown in Table 5, Example 3 has a higher yield of naphtha products in comparison to Comparative Example C. Additionally, both Example 2 and Example 3 have higher yields of liquid products in comparison to Comparative Example B and Comparative Example C, respectively. These results confirm that catalysts made by the presently disclosed method may exhibit improved performance than the comparative catalysts made by conventional methods.

TABLE 4

| HCK catalyst | Comp. Ex. B | Ex. 2 |
|---|---|---|
| Product properties | | |
| Density | 0.8053 | 0.7684 |
| S, wppm | 160 | 12.7 |
| N, wppm | 1.3 | 4.6 |
| Product yields FF | | |
| C1-C4 | 41.1 | 33.9 |
| C5-180° C. | 48.9 | 67.6 |
| 180-350° C. | 9.5 | 7.9 |
| 350-540° C. | 5.4 | 0.0 |
| >540° C. | 0.0 | 0.0 |
| C5+ liquid yield, % | 63.7 | 75.5 |

TABLE 5

| HCK catalyst | Comp. Ex. C | Ex. 3 |
|---|---|---|
| Product properties | | |
| Density | 0.7530 | 0.7628 |
| S, wppm | 20 | 20 |
| N, wppm | 6.4 | 2.4 |
| Product yields FF | | |
| C1-C4 | 15.34 | 19.07 |
| <180° C. | 70.08 | 73.49 |
| 180-350° C. | 8.43 | 14.40 |
| 350-540° C. | 1.95 | 0.00 |
| >540° C. | 0.00 | 0.00 |
| C5+ liquid yield, % | 80.46 | 87.90 |

It will be apparent to persons of ordinary skill in the art that various modifications and variations can be made without departing from the scope disclosed herein. Since modifications, combinations, sub-combinations, and variations of the disclosed embodiments, which incorporate the spirit and substance disclosed herein, may occur to persons of ordinary skill in the art, the scope disclosed herein should be construed to include everything within the scope of the appended claims and their equivalents.

For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter disclosed herein has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method for producing a catalyst composition, the method comprising:
    forming a precursor solution comprising a silicon-containing material, an aluminum-containing material, and a quaternary amine;
    hydrothermally treating the precursor solution at a first temperature to form an intermediate mixture;
    hydrothermally treating the intermediate mixture at a second temperature to form beta zeolite, wherein the first temperature is less than the second temperature by at least 200° C.;
    forming an extrudable mixture comprising the beta zeolite, alumina, a metal precursor, and a binder;
    extruding the extrudable mixture to form extrudates; and
    calcining the extrudates to form the catalyst composition.

2. The method of claim 1, wherein the beta zeolite is not calcined before extruding the extrudable mixture.

3. The method of claim 1, wherein the intermediate mixture is not dried before forming the beta zeolite.

4. The method of claim 1, wherein the silicon-containing material comprises $SiO_2$, sodium silicate, tetramethylsiloxane, tetraethylsiloxane, silicon salt, silicon alkoxide, fumed silica, or combinations thereof.

5. The method of claim 1, wherein the aluminum-containing material comprises aluminum nitrate, aluminum sulfate, aluminum alkoxide, other aluminum salts, or combinations thereof.

6. The method of claim 1, wherein the quaternary amine comprises tetraethylammonium hydroxide, tetraethylammonium bromide, or combinations thereof.

7. The method of claim 1, wherein the first temperature is of from 100° C. to 150° C.

8. The method of claim 1, wherein the second temperature is of from 500° C. to 650° C.

9. The method of claim 1, further comprising cooling the intermediate mixture before hydrothermally treating the intermediate mixture.

10. The method of claim 1, further comprising washing the intermediate mixture before hydrothermally treating the zeolite intermediate.

11. The method of claim 1, wherein the metal precursor comprises molybdenum, nickel, tungsten, or combinations of two or more thereof.

12. The method of claim 1, wherein the extrudable mixture further comprises a zeolite Y.

13. The method of claim 1, wherein the beta zeolite has a surface area of greater than or equal to 400 $cm^2/g$.

14. The method of claim 1, wherein one or more of:
the beta zeolite has a mesopore volume of greater than 0.5 mL/g;
the beta zeolite has a micropore volume of greater than 0.1 mL/g;
the beta zeolite has an average pore size of greater than 3 nanometers;
the beta zeolite has a crystallinity of at least 70% as measured using x-ray diffraction;
the catalyst composition has a surface area of greater than or equal to 250 $cm^2/g$;
the catalyst composition has a mesopore volume of greater than 0.4 mL/g; or
the catalyst composition has an average pore size of greater than 3 nanometers.

15. A method of cracking a hydrocarbon feed stream comprising contacting the hydrocarbon feed stream with the catalyst composition of claim 1 to crack at least a portion of the hydrocarbon feed stream to form a product effluent.

16. The method of claim 15, wherein the hydrocarbon feed stream is crude oil.

17. The method of claim 15, wherein the hydrocarbon feed stream is hydrotreated before the contacting.

18. The method of claim 15, wherein the product effluent comprises at least 40 wt. % naphtha.

19. A method for producing a catalyst composition, the method comprising:
forming a precursor solution comprising a silicon-containing material, an aluminum-containing material, and a quaternary amine;
hydrothermally treating the precursor solution at a first temperature to form an intermediate mixture;
hydrothermally treating the intermediate mixture at a second temperature to form beta zeolite, wherein the first temperature is less than the second temperature by at least 200° C.;
forming an extrudable mixture comprising the beta zeolite, alumina, a metal precursor, and a binder;
extruding the extrudable mixture to form extrudates; and
calcining the extrudates to form the catalyst composition;
wherein:
the beta zeolite is not calcined before extruding the extrudable mixture;
the silicon-containing material comprises fumed silica;
the quaternary amine comprises tetraethylammonium hydroxide;
the first temperature is of from 100° C. to 150° C.;
the second temperature is of from 500° C. to 650° C.; and
the metal precursor comprises molybdenum and nickel.

20. The method of claim 19, wherein the extrudable mixture further comprises a zeolite Y.

* * * * *